United States Patent
Hwang et al.

(10) Patent No.: US 11,515,682 B2
(45) Date of Patent: Nov. 29, 2022

(54) INCOHERENTLY COMBINING LASERS

(71) Applicant: Massachusetts Institute of Technology, Cambridge, MA (US)

(72) Inventors: Christopher Hwang, Watertown, MA (US); Jason E. Langseth, Malden, MA (US); Kelsey Yee, Arlington, MA (US); John Kim, Boxborough, MA (US); Yin Wan Tam, Wilmington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 282 days.

(21) Appl. No.: 16/847,894

(22) Filed: Apr. 14, 2020

(65) Prior Publication Data
US 2020/0395727 A1 Dec. 17, 2020

Related U.S. Application Data

(60) Provisional application No. 62/861,345, filed on Jun. 14, 2019.

(51) Int. Cl.
*H01S 3/094* (2006.01)
*H01S 3/067* (2006.01)

(52) U.S. Cl.
CPC ...... *H01S 3/06729* (2013.01); *H01S 3/06745* (2013.01); *H01S 3/094007* (2013.01); *H01S 3/094042* (2013.01)

(58) Field of Classification Search
CPC ........... H01S 3/06729; H01S 3/094007; H01S 3/094042
See application file for complete search history.

(56) References Cited

U.S. PATENT DOCUMENTS

| | | | |
|---|---|---|---|
| 4,900,114 A | 2/1990 | Mortimore et al. | |
| 7,593,435 B2 | 9/2009 | Gapontsev et al. | |
| 8,818,151 B1* | 8/2014 | Ward | H01S 3/094053 385/115 |
| 9,871,338 B2* | 1/2018 | Price | H01S 3/094007 |

OTHER PUBLICATIONS

Wang et al., "Review of fabrication techniques for fused fiber components for fiber lasers." Fiber Lasers VI: Technology, Systems, and Applications. vol. 7195. International Society for Optics and Photonics, 2009. 11 pages.

* cited by examiner

*Primary Examiner* — Michael Carter
(74) *Attorney, Agent, or Firm* — Smith Baluch LLP

(57) ABSTRACT

Incoherently combining light from different lasers while maintaining high brightness is challenging using conventional fiber bundling techniques, where fibers from different lasers are bundled adjacently in a tight-packed arrangement. The brightness can be increased by tapering the tips of the bundled fibers to match a single, multi-mode output fiber, e.g., one whose core that is just wide enough to fit the input cores. This increases the brightness of the beam combining. In addition, reducing the outer diameters of the signal fiber claddings allows the signal fibers to be bundled closer together, making it possible to couple more signal fiber cores to the core of a multi-mode output fiber. Similarly, reducing the outer diameter of the pump fiber cladding and/or etching away corresponding portions of the signal fiber cladding in a pump/signal combiner makes it possible to couple more pump light into the signal fiber cladding, again increasing brightness.

18 Claims, 10 Drawing Sheets

Signal Fiber Diameter = $D_s$
Signal Fiber Radius = $R_s$
Pump Fiber Diameter = $D_p$
Pump Fiber Radius = $R_p$
Etch Depth = $E_d$
Etch Width = $E_w$ $$E_d = \frac{D_s - D_p}{2}$$

$$E_w = 2R_s \sin\frac{60°}{2}$$

$$E_w = 2R_p \sin\frac{\theta_p}{2}$$

$$\theta_p = 2\sin^{-1}\left(\frac{E_w}{2R_p}\right)$$

$$\text{Groove Arc Length} = R_p \theta_p$$

Figure 2. Transmission through a bottle splice for the fundamental $LP_{01}$ mode (left) and filter of the $LP_{11}$ mode (right).

INCOHERENTLY COMBINING LASERS

CROSS-REFERENCE TO RELATED APPLICATION(S)

This application claims the priority benefit, under 35 U.S.C. 119(e), of U.S. Application No. 62/861,345, filed on Jun. 14, 2019, which is incorporated herein by reference in its entirety.

GOVERNMENT SUPPORT

This invention was made with Government support under Grant No. FA8702-15-D-0001 awarded by the U.S. Air Force. The Government has certain rights in the invention.

BACKGROUND

Incoherent beam combining enables higher total output power of laser systems without increasing brightness. For many industrial applications where propagation of a laser beam over long distances while maintaining small spot size is not important, incoherent combining offers laser manufacturers a way to construct a higher power system without the complexities of coherent or spectral beam combining.

SUMMARY

Fiber lasers have become industrial workhorses for laser machining, welding, and brazing applications due to their low cost, high reliability, and excellent beam quality, and due to these factors are excellent candidate subcomponents for incoherently combined laser systems. However, current methods of constructing incoherently combined fiber laser systems do not take full advantage of the brightness of the pump lasers, the efficiency of large-mode-area fusion splice processes, or the brightness of the fiber lasers themselves. The present technology includes developments in all three areas that enable overall higher power (e.g., about twice the overall power) incoherently combined laser systems than the state-of-the-art.

The first development includes a fiber pump/signal combiner comprising a signal fiber having a core and a cladding and pump fiber cores having outer surfaces in direct contact with an outer surface of the cladding of the signal fiber. The outer surface of the cladding of the signal fiber defines grooves to receive the pump fiber cores. These grooves can be laser machined into the outer surface of the cladding of the signal fiber. In some cases, the signal fiber has an outer diameter of about 400 µm, the pump fiber cores have outer diameters of about 250 µm, and the grooves are about 198 µm wide and 75 µm deep. More generally, the signal fiber has a maximum outer diameter of $D_s$, the pump fiber cores have diameters of $D_p$, and the grooves can have depths of $E_d = D_s - D_p/2$. Similarly, if the signal fiber has a maximum outer radius of $R_s$, the grooves have widths of $E_w = 2R_s \sin(\theta/2)$, where $\theta$ is 360° divided by the number of pump fiber cores. In these cases, the cladding of the signal fiber has a cross section formed by the geometric subtraction of six circles with diameters equal to those of the pump fiber cores from a larger circle.

The second development includes bottle splices. In a bottle splice, a first large-mode-area (LMA) fiber is spliced to the adiabatically tapered end of a second LMA fiber such that the core of the first LMA fiber couples a fundamental LP01 spatial mode into the core of the second LMA fiber. The end of the first LMA fiber can be adiabatically tapered as well. The mode field areas/diameters of the first and second LMA fibers can be different. The core of the second LMA fiber can guide the fundamental LP01 spatial mode from the first LMA fiber. And the core of the first LMA fiber can launch at least one higher-order spatial mode into a cladding of the second LMA fiber.

The third development includes an incoherent beam-combining apparatus with optical fibers tapered together to form a multimode tip that is spliced to a multimode fiber. Each of the optical fibers forming the multimode tip has a core surrounded by a cladding with an outer diameter of less than about 50 µm (e.g., an outer diameter of 30 µm). These optical fibers may include a central optical fiber having a grooved outer surface and other optical fibers in respective grooves of the grooved outer surface. The cores of the optical fibers may span a distance less than or equal to a diameter of a core of the multimode fiber. The incoherent beam-combining apparatus may also include a glass capillary tube surrounding at least a portion of the optical fibers.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
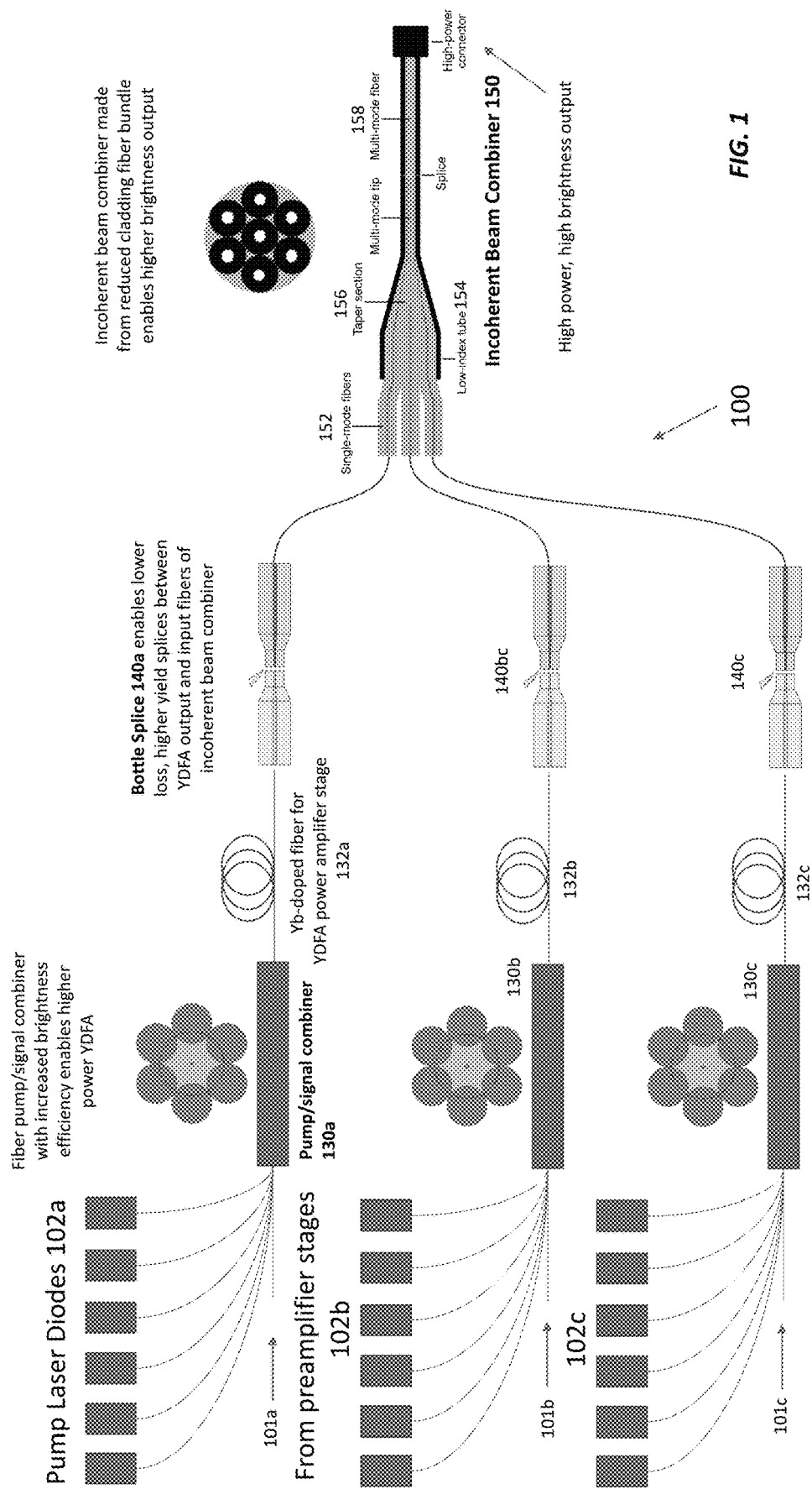
FIG. 1 shows a high-power, incoherently combined fiber laser system.

FIG. 1 shows a high-power fiber laser system 100. This system 100 includes several sets of fiber-coupled pump laser diodes 102a-102c (collectively, pump laser diodes 102). The fibers from the sets of fiber-coupled pump laser diodes 102 are coupled to respective fiber pump/signal combiners 130a-130c (collectively, fiber pump/signal combiners 130). The input fiber claddings of these fiber pump/signal combiners 130 are removed to increase the brightness efficiency of the fiber pump/signal combiners 130 as described in greater detail below. The fiber pump/signal combiners 130 combine the outputs of the pump laser diodes 102 with respective seed (signal) laser beams 101a-101c from seed lasers (not shown). The outputs of the fiber pump/signal combiners 130 are coupled into respective Yb-doped fiber amplifiers (YDFAs) 132a-132c, which can be higher power than in a conventional fiber laser system thanks to the higher brightness efficiency of the pump/signal combiners 130. Assuming an industry-standard 400 µm diameter cladding fiber on the output of the pump/signal combiner, a conventional combiner has a brightness efficiency of 34% while the combiner 130 in FIG. 1 has a brightness efficiency of 64%.

The outputs of the YDFAs 132 are spliced via respective bottle splices 140a-140c, which provide lower-loss, higher-yield connections to large-mode-area (LMA) optical fibers 152a-152c than conventional splices. These LMA fibers 152 extend from an incoherent beam combiner 150, which has a tapered section 156 over which the claddings of the fibers are thinner than normal. The fibers with these thinner claddings are tapered together to join a multimode fiber output 158 for better brightness performance as described in greater detail below.

Compared to other fiber laser systems, the high-power fiber laser system 100 can emit beams with about twice the power and dozens of times the brightness or radiance (radiance is the optical power per unit area and solid angle; its SI units are $W\,cm^{-2}\,sr^{-1}$) and can operate with lower losses. The lower losses come in part from the bottle splices 140, which tend to have lower insertion losses the conventional connections or splices between (mis-matched) large-mode-area fibers. And the higher radiance is due in part to the construction of the fiber pump/signal combiners 130, where the cores of the pump fibers are in contact with grooves in the cladding of the signal fiber. The higher radiance is also due in part to the construction of the incoherent beam combiner 150, where the claddings of the input fibers have reduced diameters so more input fiber cores can be mated or coupled to the core of the multi-mode output fiber. As explained below, if the practical lower limit on the fiber cladding diameter is about 30 µm, compared to the standard 400 µm diameter claddings, this represents an increase in radiance of about 178 based solely on geometry. If the power is roughly doubled, the total radiance increases by a factor of 345.

Fiber Pump/Signal Combiners

Figure 2:
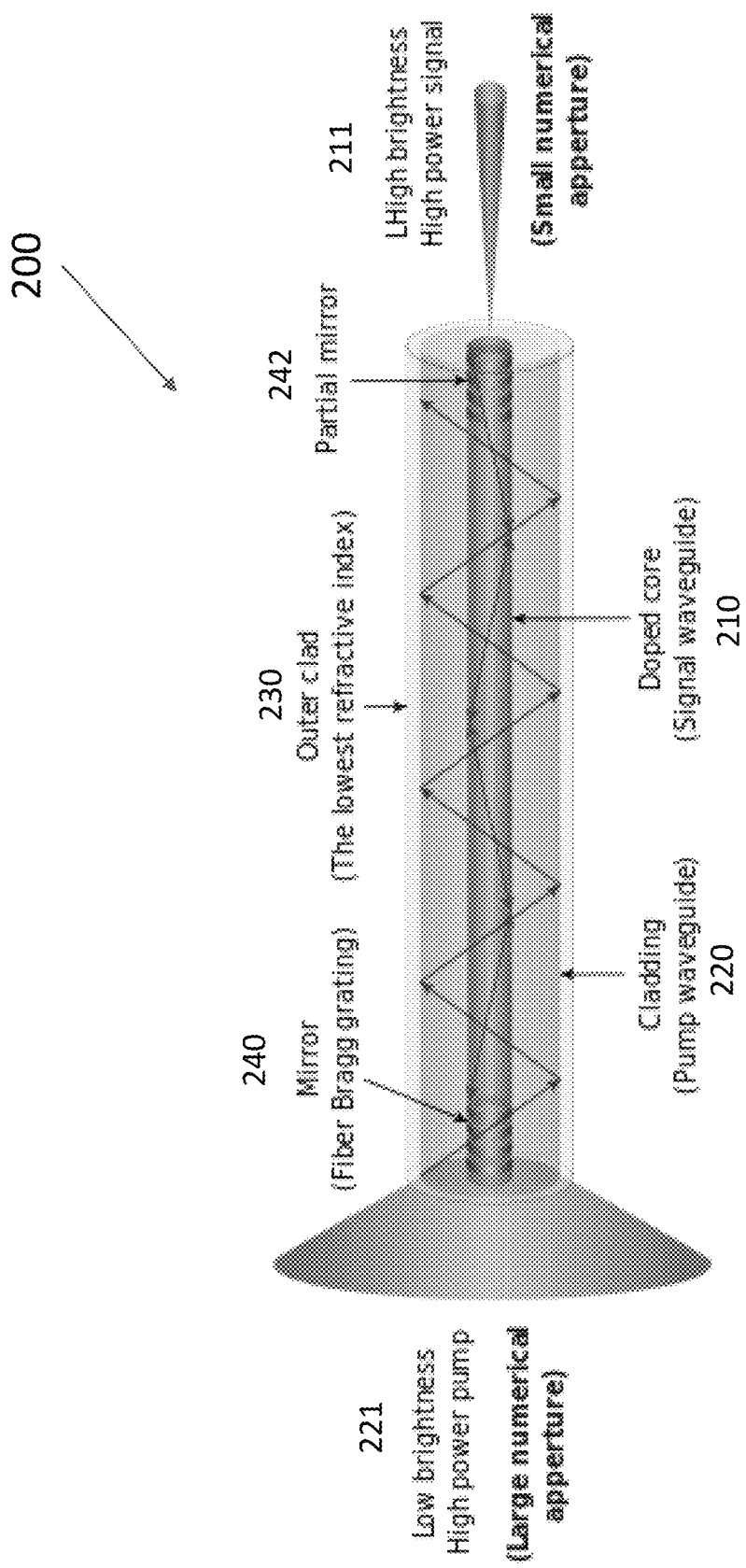
FIG. 2 is a schematic showing how pump light is coupled into the cladding and signal light is coupled into the doped core of a double-clad fiber.

FIG. 2 shows a conventional end-pumped, double-clad active fiber 200 that converts low-brightness pump light 221 into higher-brightness signal light 211. It includes a dual-clad fiber with a core 210 doped with a rare earth ion (e.g., ytterbium), an inner cladding 220, and an outer cladding 230 with a lower refractive index than the doped core 210 and the inner cladding 220. The doped core 210 guides a signal beam 211, and the inner cladding 222 guides a high-power pump beam 221. As the pump beam 211 crosses through the doped core 210, it excites dopant ions in the core 210, which amplify the signal beam 211.

In this case, a high reflector 240 and a partial reflector 242 (e.g., Bragg mirrors) are etched into opposite ends of the doped core 210, indicating that the fiber 200 is being used as a laser oscillator. The high reflector 240 and the partial reflector 242 reflect light at the signal wavelength. The partial reflector 242 couples the signal beam 211 into and out of the cavity formed in the doped core 210 between the high reflector 240 and the partial reflector 242. The pump beam 221 amplifies the signal beam 211 as the signal beam 211 makes successive round trips through the core 210 between the high reflector 240 on the left and the partial reflector 212 on the right.

FIG. 2 shows that the pump beam 221 is coupled into the end of the double-clad active fiber 200 over a much larger numerical aperture than the signal beam 211. End pumping typically involves a bundle of hexagonally-packed fibers (e.g., 6+1:1 or 18+1:1) and often a capillary tube to assist with the bundling. (The notation 6+1:1 refers to 6 pump fibers plus 1 signal fiber coupled into 1 output fiber.) The entire bundle is tapered down to match the double-clad active fiber 200, shown in FIG. 2, with the tapering increasing the pump light divergence angle (the numerical aperture (NA) of the pump light 221). If the NA of the double-clad active fiber is equal to or greater than the NA of the pump light 221, the pump light 221 should couple completely into the double-clad optical fiber (neglecting losses from absorption, scattering, and other non-idealities).

The pump beam 221 can also be coupled into the inner cladding 220 of the double-clad active fiber 200 via the side instead of the end. In a side-pumped configuration, a tapered pump fiber (not shown) wraps around the double-clad active fiber 200, preserving the signal light 211 propagating in the fiber core 210 at the expense of compromised pump beam transmission. (Conversely, end pumping tends to have good pump beam transmission but compromised signal transmission if the signal core 210 is also tapered and doesn't match the core mode field diameter of the active fiber 200.)

Hybrid configurations have shown excellent performance: an example hybrid configuration may include pump fibers that are spliced to the end facet of a capillary tube. The capillary tube is tapered and collapsed around or spliced directly to the double-clad fiber 200. This is a side-pumped configuration that makes use of circular symmetry to ease the fabrication challenges.

No matter the pumping configuration, there is a limit to the amount of pump light that can be pumped into the inner cladding. The amount of pump light pumped into the inner cladding in turn limits the output power of the fiber laser.

Figure 3B:
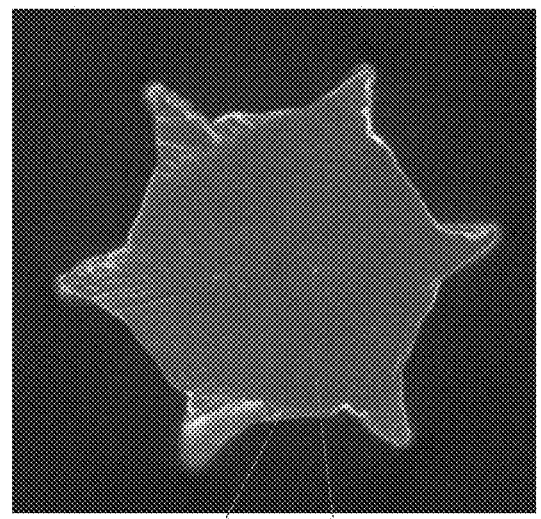
FIG. 3B shows a cross-sectional image of a laser-machined signal fiber in a pump/signal combiner with reduced cladding.
Figure 3A:
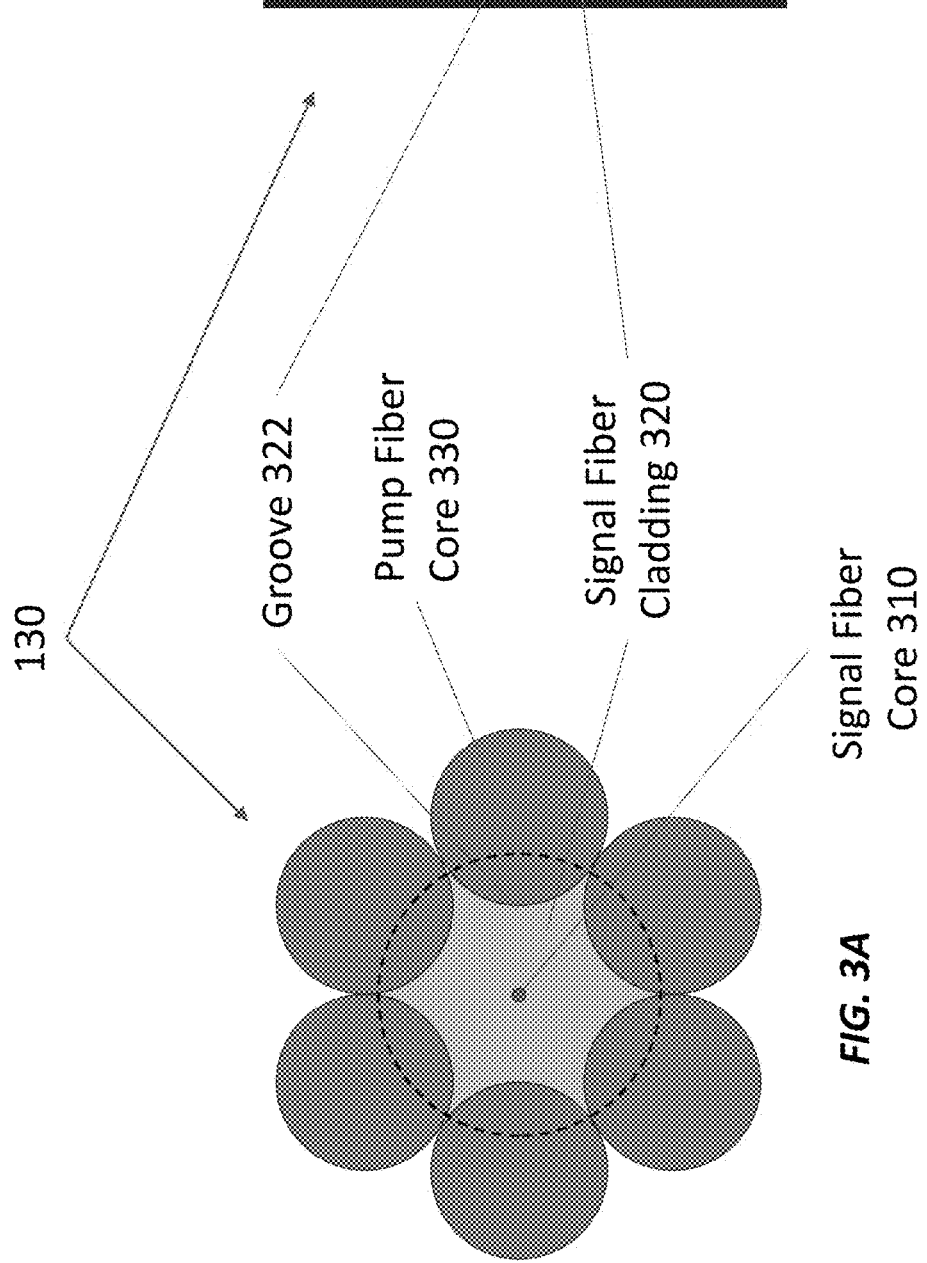
FIG. 3A shows a cross section of a pump/signal combiner with reduced cladding for more efficient fiber bundling and increased brightness efficiency.

FIGS. 3A and 3B illustrate cross sections of the fiber pump/signal combiner 130 in the system 100 of FIG. 1. This fiber pump/signal combiner 130 can be used to couple more pump light into the fiber amplifier 132. It can also be used in other systems, including other types of fiber amplifiers, fiber lasers, and beam combiners.

FIG. 3A is a schematic showing six pump fiber cores 330 around a single-mode signal fiber with a core 310 and a cladding 320 has a roughly star-shaped outer perimeter instead of a conventional circular outer perimeter. (In this example, the pump fiber claddings are completely removed, but in other examples there may be some pump fiber cladding left around the pump fiber cores 330.) The pump fiber cores 320 are fit into grooves 322 in the signal fiber cladding 320. The cross-sectional shape or perimeter of the cladding 320 in FIG. 3A can be considered to be the geometric subtraction of six circles with diameters equal to those of the pump fiber cores 330 from the larger central (signal) fiber. When viewed at angle or from the side, the outer surface of the signal-fiber cladding 320 appears fluted or grooved along a portion of its length, with one pump fiber core 330 nestled in each groove 322.

The cross section of the center fiber can be made by etching six smooth, roughly semi-circular grooves in the central fiber. These grooves can be about 3-4 cm long and may twist around the fiber, with the pump fibers twisted around the center fiber and azimuthally aligned to the grooves. The six pump fiber cores 320 can then be hexagonally close packed around and fused to the center of the center (signal) fiber. For a 400 µm diameter central (signal) fiber and 250 µm diameter outer fibers, the grooves should be 198.1 µm wide and 75 µm deep. In this case, each groove represents the removal 10,255 µm$^2$ of the central (signal) fiber's cross section, for a total of 61,530 µm$^2$ of the cross section ablated away, leaving 64,134 µm$^2$ left of the original 125,664 µm$^2$ cross section of the central fiber.

FIG. 3B is a photograph of one end of a laser-machined signal fiber, which in this case has a cross section whose shape is roughly that of a hexagram (six-pointed star) superimposed on a circle whose radius is longer than the hexagram's in radius and shorter than the hexagram's circumradius. (The cross section in FIG. 3B can be considered an approximation of the cross section in FIG. 3A.)

Figures 3C, 3D:
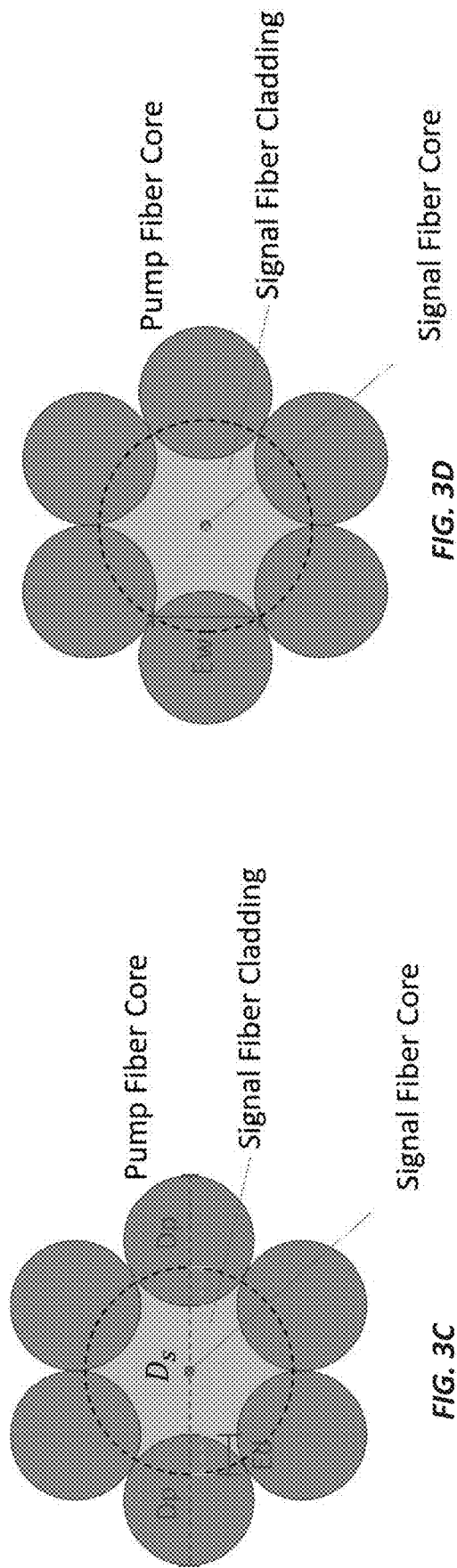
FIGS. 3C and 3D illustrate the geometry of the pump/signal combiner of FIG. 3A in greater detail.

FIGS. 3C and 3D illustrate the cross-sectional geometry of the fiber pump/signal combiner 130 in greater detail. The signal fiber has a nominal (unetched) radius $R_s$ and a nominal (unetched) diameter $D_s$. Likewise, the pump fiber core has a radius $R_p$ and a diameter $D_p$. The grooves 322 in the signal fiber cladding 320 have depths $E_d$ and widths $E_w$, which can be expressed as:

$$E_d = \frac{D_s - D_p}{2}$$

$$E_w = 2R_s \sin\frac{\theta_s}{2}$$

where $\theta_s$ equals 360° divided by the number of pump fiber cores 330. In this case, there are six pump fiber cores 330, as shown in FIGS. 3A-3D, so $\theta_s = 60°$.

With $E_w$ calculated from the signal fiber radius, the arc length of the groove can be calculated from the pump fiber core radius. The arc length would be calculated as $R_p\theta_p$, but $\theta_p$ is not necessarily equal to $\theta_s$ (=60°) since the pump fiber has a different diameter than the signal fiber. The chord length equation holds and can be used to solve for $\theta_p$:

$$E_w = 2R_p \sin\frac{\theta_p}{2}$$

$$\theta_p = 2\sin^{-1}\left(\frac{E_w}{2R_p}\right)$$

This gives the length of the arc of the portion of the circle etched out to hold the pump core fiber.

The fiber pump/signal combiner 130 in FIGS. 3A-3D can be used to increase the amount of pump light coupled into a cladding-pumped fiber laser or amplifier, such as the YDFAs 132 in the laser system 100 of FIG. 1. In this combiner, multimode fiber cores (e.g., pump cores 320) guiding the pump light are arranged circumferentially about a signal fiber, e.g., in a 6+1:1 configuration as shown in FIG. 3A, much like in a conventional hybrid configuration. Unlike in a conventional hybrid configuration, however, the multimode fibers have thinner claddings (e.g., claddings less than 10 µm thick) or possibly no cladding at all as shown in FIG. 3A. In addition, the outer surface of the cladding of the signal fiber may be fluted with grooves or recesses shaped to accommodate the pump fiber cores as shown in FIGS. 3A and 3B.

Reducing the cladding thickness for the pump fiber makes it possible to bundle the pump and signal fibers more closely together. This increases the cross-sectional area devoted to guiding pump light within the capillary tube (not shown) holding the bundle together. It also reduces the amount of tapering necessary to match the bundle pump and signal fibers to the double-clad active fiber, which has an NA limited to 0.46.

The reduced tapering enables larger pump fibers, which enables additional pump light acceptance. A state-of-the-art conventional pump/signal combiner has a pump-light acceptance cross section of 188,400 µm$^2$ at a 0.22 NA. By comparison, a fiber pump/signal combiner like the ones in FIGS. 3A and 3B has a pump-light acceptance cross section that is about twice as big (e.g., about 350,689 µm$^2$) for the same size fiber cores. This higher pump-light acceptance cross section leads to higher brightness for the combiner and higher gain and higher output power for the laser or amplifier.

The claddings can be removed from the pump and signal fibers using chemical etching or ablation with a $CO_2$ laser as in FIG. 3B. Laser machining is significantly safer than chemical etching and improves the manufacturability of high power pump/signal combiners. Additionally, using a $CO_2$ laser to machine the cladding enables unique geometries. A "flower" shaped geometry could reduce the distortion of the fibers during the tapering process, resulting in higher signal transmission.

For the pump fibers, the fluorinated cladding layer may be removed entirely. The fluorinated cladding provides total internal reflection to guide the pump light along the pump fiber but is not necessary in the fiber pump/signal combiner because the surrounding medium (e.g., air) has a lower refractive index than the pump fiber core and so guides the pump light over the (relatively short) length of the fiber pump/signal combiner. Likewise, the signal fiber has a large cladding that guides the pump light but is also not necessary in the fiber pump/signal combiner.

Low-Loss Junctions Between Few-Moded Optical Fibers

Figure 4A:
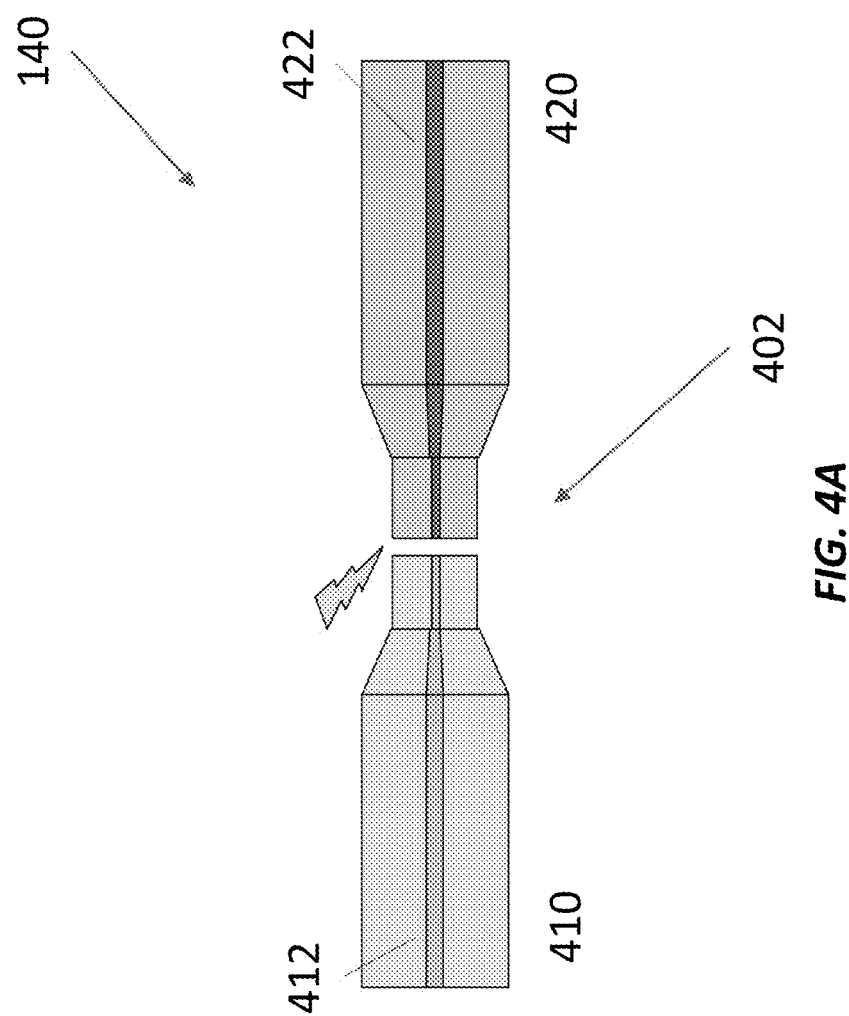
FIG. 4A shows a bottle splice suitable for joining dissimilar large mode area (LMA) fibers in the high-power, incoherently combined fiber laser system of FIG. 1.
Figures 4B, 4C:
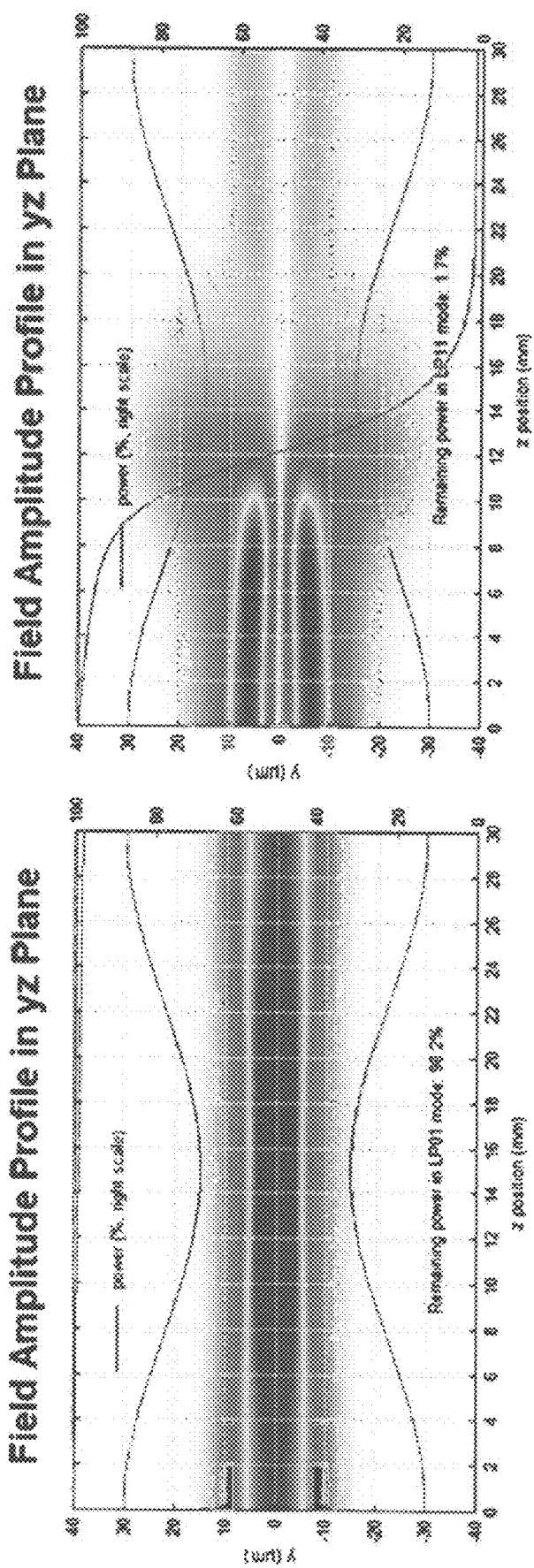
FIG. 4B illustrates transmission through a bottle splice for the fundamental $LP_{01}$ spatial mode.
FIG. 4C illustrates transmission through a bottle splice for the $LP_{11}$ spatial mode.

FIGS. 4A-4C illustrate low-loss junctions, also called bottle splices, between pairs of few-moded optical fibers. These few-moded optical fibers may be LMA core optical fibers like those used in high-power fiber lasers and amplifiers. LMA fibers enable power scaling by allowing the fundamental mode to have a larger mode field diameter, thereby reducing the effects of nonlinearities. Bottle splices can be include fiber lasers like those in FIG. 1, fiber amplifiers, fiber beam combiners, and other applications that use LMA fibers, including telescopes.

FIG. 4A show a bottle splice 140 between a first LMA fiber 410 and a second LMA fiber 420. These LMA fibers 410 and 420 have cores 412 and 422, respectively, that have different diameters (e.g., 15-30 μm) and may also guide different numbers of modes (e.g., 1-6 modes). The LMA fibers 410 and 420 are tapered or drawn to the desired diameter, then cleaved to produce faceted ends that can be spliced together. The cores 412 and 422 are centered on the same axis and spliced together so that they form a continuous optical path that supports at least one optical path along its length, with adiabatically tapered ends of the fibers 410 and 420 being joined in the bottle splice 140. This adiabatic tapering reduces the fiber diameter on both fiber ends before the fiber ends are joined together, resulting in the bottle splice 140. The reduced fiber diameters of the adiabatically tapered ends can be selected such that the cores of the spliced LMA fibers 410 and 420 guide only one mode and any higher-order modes are filtered out.

For instance, FIGS. 4B and 4C show transmission through a bottle splice for the fundamental $LP_{01}$ mode and filtering of the $LP_{11}$ mode, respectively. This filtering provides a convenient way to match the fundamental mode fields of two mismatched LMA fibers while eliminating or reducing higher-order mode content. In one example, a fiber with a 25 μm core diameter and 0.06 NA, which yields a 21 μm mode field diameter, is tapered down to match a fiber with 10 μm core diameter, 0.075 NA, and 11.5 μm mode field diameter. In this case, the 10 μm, 0.075 NA core fiber does not need to be tapered because it is already single-mode. Making it even smaller would reduce the dependence of splice loss on cleave angle because a smaller mode field diameter (MFD) is usually less sensitive to cleave angle. If the 25 μm, 0.06 NA fiber is tapered to too small of a diameter, the MFD may start to increase as the mode starts to escape the core of the fiber, so there are limits to how far down this fiber can be tapered.

A bottle splice between LMA fibers may have lower loss than other types of connections between LMA fibers. In general, it can be difficult to splice or mate LMA fibers because the fiber cleave angle and pointing angle significantly affect the coupling loss. The fundamental mode transmission loss in conventionally spliced LMA fibers is typically around 0.1 dB to 0.2 dB (2.3% to 4.5%), compared to a loss of about 0.02 dB (0.5%) when joining single-mode fibers. Conversely, the adiabatic tapering reduces transmission loss of the fundamental mode to less than 0.1 dB, possibly to a loss as little as that of a splice between single-mode fibers (e.g., 0.09 dB, 0.08 dB, 0.07 dB, 0.06 dB 0.05 dB, 0.04 dB, 0.03 dB, 0.02 dB, or lower).

A bottle splice's lower loss comes at least in part from a change in manufacturing tolerances versus a conventional LMA fiber splice. Adiabatically tapering the fiber ends relaxes the stringent fiber cleave and pointing specifications for splicing LMA fiber. Instead of stringent fiber cleave and pointing tolerances, the bottle splice has more stringent transverse positioning tolerances, which are easier to meet thanks to readily available fine steering actuators in modern splicing equipment.

Without adiabatic tapering, the waveguide-to-waveguide pointing angle requirement for 1% loss at 18 μm MFD is 0.015°, which is difficult to achieve. By utilizing a bottle splice at 11.5 μm MFD, the waveguide-to-waveguide pointing angle is relaxed to 0.024°. This difference may seem small, but it can increase the fiber cleave yield significantly. The positioning for 1% loss, on the flip side, requires alignment to at least 1.8 μm for the 18 μm MFD case. This alignment tolerance increases to 1.15 μm for the 11.5 μm MFD case, which is very easy for modern stepper-motor-based splicing equipment to hit.

A similar adiabatic tapering process has been used in mode field adaptors (MFAs), which are used to match the larger mode fields in LMA fibers to fibers with smaller mode fields. MFAs are different than a bottle splice in that the taper is typically only used on one side of the junction in an MFA whereas both sides of a bottle splice are tapered. The bottle splice is also different than in other splices, including those in U.S. Pat. No. 4,900,114 A, because the fundamental mode remains the core on both sides of the splice rather than propagating from core to cladding.

Incoherently Combining Laser Beams

Figure 5A:
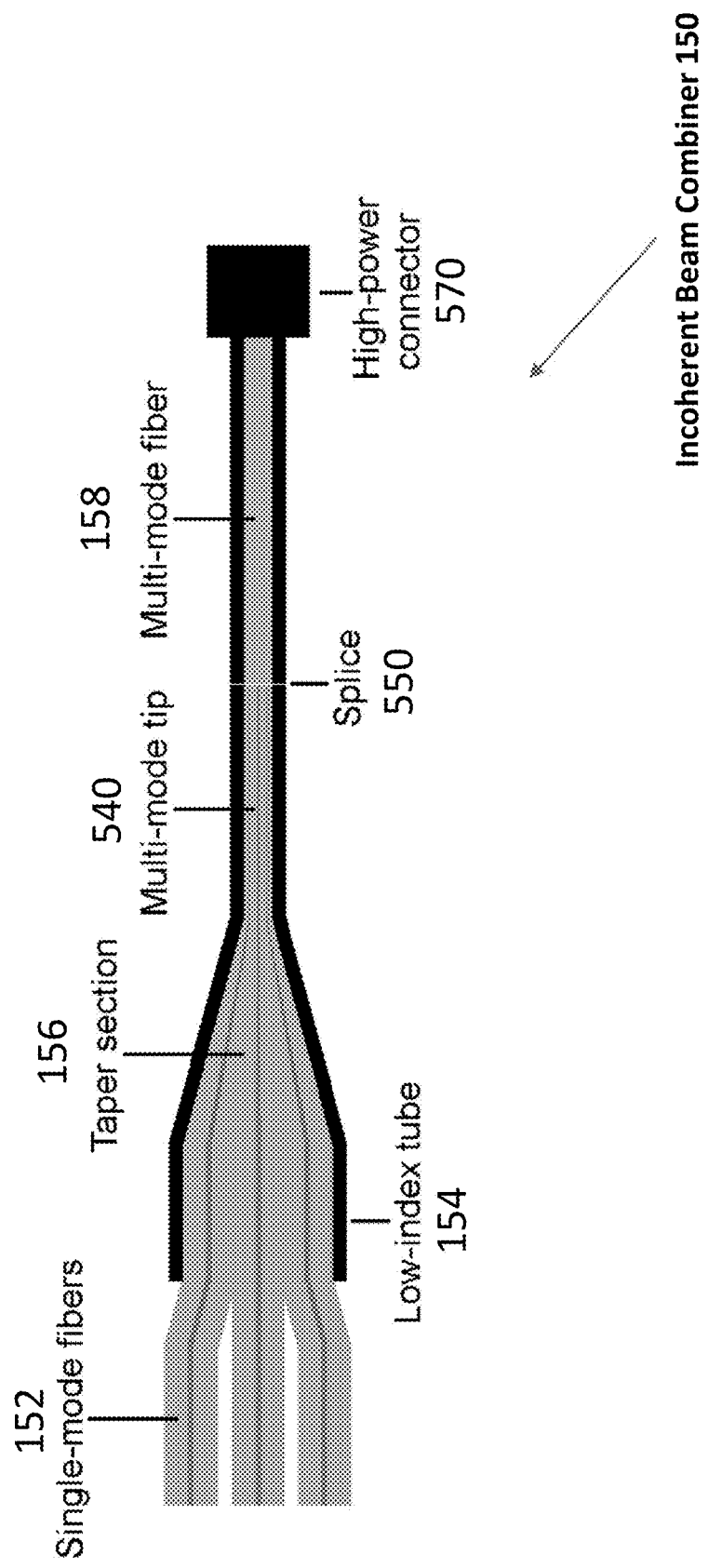
FIG. 5A shows an incoherent beam combiner made from a reduced cladding fiber bundle suitable for use in the high-power, incoherently combined fiber laser system of FIG. 1.

FIG. 5A shows the incoherent beam combiner 150 in the high-power fiber laser system 100 of FIG. 1 in greater detail. The incoherent beam combiner 150 incoherently combines laser light while maintaining high brightness. Like the pump/signal combiners 130 and bottle splices 140, the incoherent beam combiner 150 can be used in other types of fiber lasers as well as in fiber amplifiers and other active and passive fiber devices.

The incoherent beam combiner 150 includes several large-mode area (LMA) fibers 152 as inputs. The ends of these fibers 152 are bundled or placed adjacently in a tightly packed arrangement (e.g., seven or more circles packed within a circle) surrounded by a glass capillary tube 154 with a low refractive index. The ends of the LMA fibers 152 in the glass capillary tube 154 have claddings that are stripped away or reduced in thickness, e.g., to about 30 μm, using chemical etching or $CO_2$ laser machining as described above. All-glass bundling (shown in FIG. 5A as glass fibers 152 in a glass capillary tube 154) better withstands heating from scattering of the high-power laser light guided by the fibers 152.

The packed fibers 152 are tapered through a tapered region 156 down to a multi-mode tip 540 that is spliced at a splice 550 to a multi-mode output fiber 158. As explained in greater detail below with respect to FIGS. 5B-5D, the cores of the tapered, packed fibers 152 extend to the end of the multi-mode tip 540, maintaining their packing geometry (e.g., if the cores are seven circles packed within a circle at the wide end of the capillary tube 154, then the cores at the end of the multi-mode tip 540 are also seven circles in the same arrangement). The cores remain distinct along the length of the fibers 152 (that is, they don't merge together in the tapered region 156) and span a distance less than or equal to the core diameter of the multi-mode fiber 158. The output fiber 158 is coupled, in turn, to high-power fiber connector 570 that can be connected to another device or system.

Figure 5B:
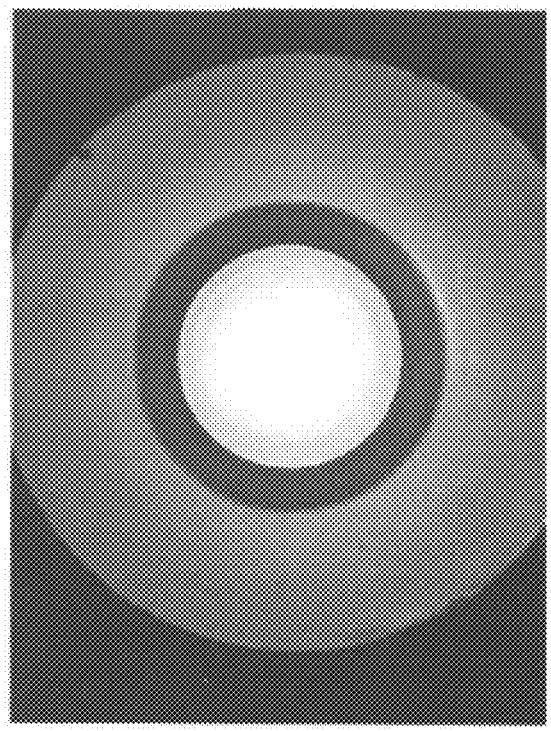
FIG. 5B shows a cross-sectional view of the tapered bundle of fibers (left) matching the multi-mode output fiber (right).
Figure 5B:
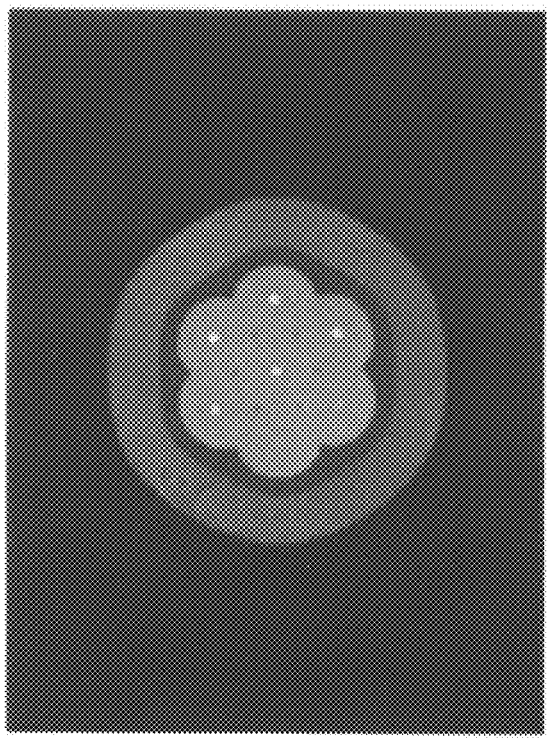
Figure 5C:
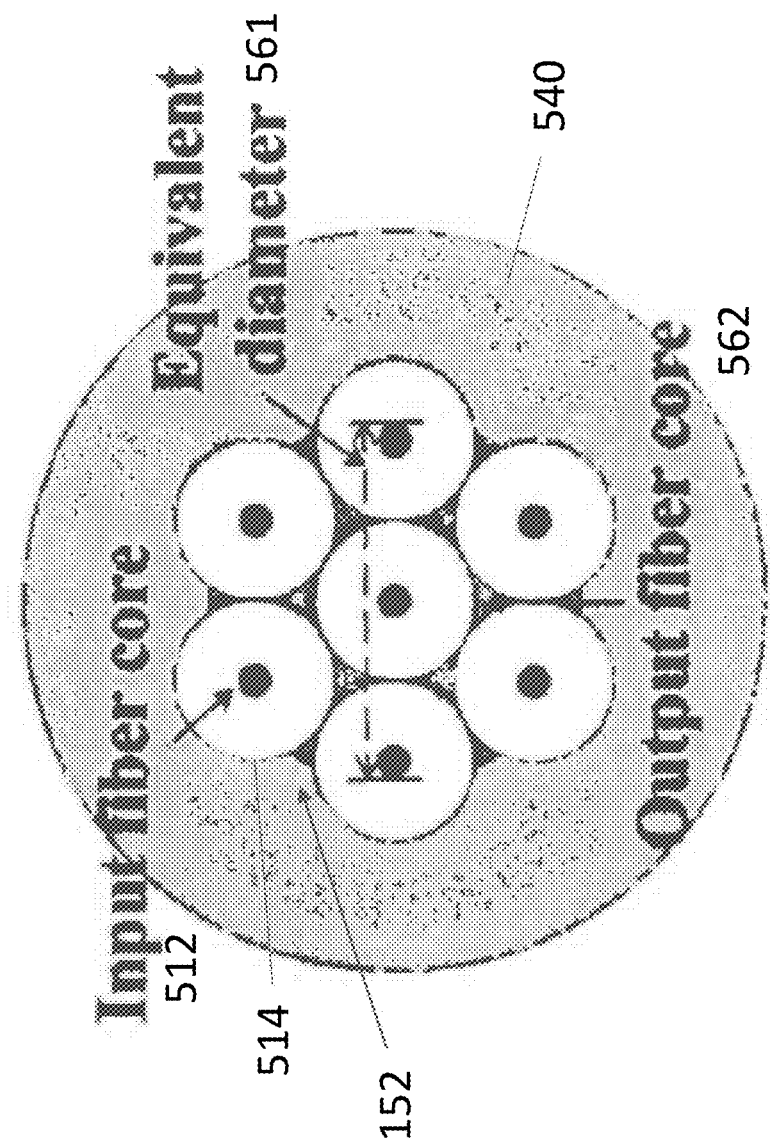
FIG. 5C shows how bundled input fibers can be packed together so their cores match the core of a multi-mode output fiber to increase brightness of the beam combining.

FIG. 5B shows cross-sectional pictures of a tapered bundle of seven LMA fibers (left; representing the end of the multi-mode tip 540 in FIG. 5A) matching a multimode fiber (right; multi-mode fiber 158 in FIG. 5A). FIG. 5C shows a schematic of the tip 540 of the tapered bundle measured against the diameter ("Equivalent diameter 561") of the core of the multimode fiber 158. The multimode output fiber's core 562 is just large enough to fit the cores 512 of the LMA fibers 158. Put differently, the diameter of the output fiber's core 562 is approximately equal to the diameter of a circle tangent with the outermost LMA fiber cores in the tapered bundle.

By reducing the outer diameters of the LMA fiber claddings 514 (e.g., to 50 μm, 45 μm, 40 μm, 35 μm, or 30 μm), more LMA fiber cores 512 fit within the diameter of the multimode fiber core 562, increasing the brightness (radiance) of the incoherently combined beam. With smaller claddings, a larger portion of the multimode fiber core 562 is illuminated by light from the LMA fibers 158, and less of the multimode fiber core 562 is "dark" (unlit), over the same numerical aperture. This increases the maximum possible brightness (radiance) of the beam emitted by the incoherent beam combiner 150. A practical lower bound to cladding outer diameter of the LMA fibers is about 30 µm—any smaller than that and handling gets difficult. The size of the multimode fiber core depends on the application, with larger cores providing more power because they can accommodate more LMA fibers but often at the expense of beam quality. This trade between power and beam quality usually depends on the application.

For a seven-fiber 20 µm diameter core/400 µm diameter cladding incoherent beam combiner, the LMA fibers couple into a multimode fiber core that is at least 818 µm in diameter, just capturing the edges of the mode field in the multimode fiber core. Given an 18 µm mode field diameter, only 0.0484% of the multimode core is illuminated. Reducing the outer diameters of the LMA fibers to 30 µm increases the illuminated fraction of the multimode core to 4%—a 100-fold increase.

Figure 5D:
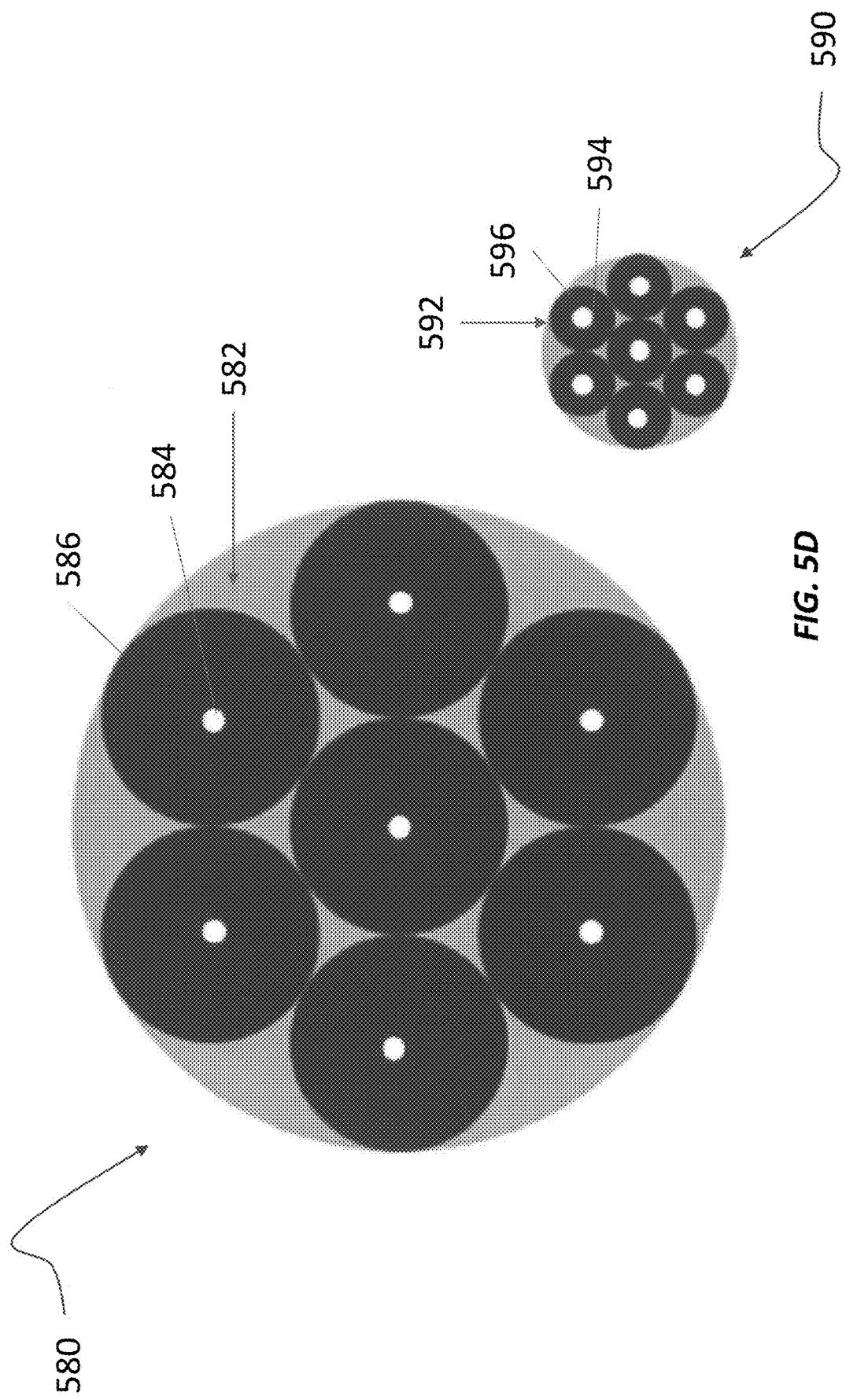
FIG. 5D shows a cross-sectional view of seven conventional fibers bundled together (left) and a cross-sectional view of seven fibers with reduced claddings bundled together (right) at the same scale.

FIG. 5D shows how tightly the LMA fibers can be packed together by reducing their outer cladding diameters. The left side of FIG. 5D shows conventional LMA fibers 582 (for example, the LMA fibers 152 at left in FIG. 5A) with cores 584 and claddings 586 packed together in a fiber bundle 580 with a hexagonal packing arrangement. The right side of FIG. 5D shows a fiber bundle 590 with LMA fibers 592 with cores 594 of the same diameters and claddings 596 with reduced outer diameters in the same hexagonal packing arrangement. The core packing density is at least seven times higher for the fiber bundle 590 with the reduced outer cladding diameters; as a result, the brightness achievable with the fiber bundle 590 with the reduced outer cladding diameters is at least seven times higher than the other fiber bundle 580. Similarly, a decrease in the outer cladding diameter from 818 µm to 90 µm should result in an approximately 82-fold increase in brightness (radiance).

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A fiber pump/signal combiner comprising:
a signal fiber having a core and a cladding; and
a number of pump fiber cores having outer surfaces in direct contact with grooves in an outer surface of the cladding of the signal fiber,
wherein the signal fiber has a maximum outer diameter of $D_s$, the pump fiber cores have diameters of $D_p$, and the grooves have depths of $E_d=(D_s-D_p)/2$.

2. The fiber pump/signal combiner of claim 1, wherein the grooves are laser machined into the outer surface of the cladding of the signal fiber.

3. The fiber pump/signal combiner of claim 1, wherein the signal fiber has a maximum outer radius of $R_s$, and the grooves have widths of $E_w=2R_s \sin(\theta/2)$, where $\theta$ is 360° divided by the number of pump fiber cores.

4. The fiber pump/signal combiner of claim 1, wherein the cladding of the signal fiber has a cross section formed by geometric subtraction of at least six circles with diameters equal to those of the pump fiber cores from a larger circle.

5. A fiber laser system comprising the fiber pump/signal combiner of claim 1.

6. The fiber pump/signal combiner of claim 1, wherein the number of pump fiber cores is exactly six.

7. The fiber pump/signal combiner of claim 1, wherein the cladding of the signal fiber has a cross section formed by geometric subtraction of exactly six circles with diameters equal to those of the pump fiber cores from a larger circle.

8. The fiber pump/signal combiner of claim 1, wherein the pump fiber cores and the grooves twist around the outer surface of the cladding of the signal fiber.

9. The fiber pump/signal combiner of claim 1, wherein each of the grooves represents removal of 10,255 $\mu m^2$ of a cross section of the signal fiber.

10. The fiber pump/signal combiner of claim 1, wherein the fiber pump/signal combiner has a pump-light acceptance cross section that is larger than 188,400 $\mu m^2$.

11. The fiber pump/signal combiner of claim 1, wherein adjacent pump fiber cores are in direct contact with each other.

12. A fiber pump/signal combiner comprising:
a signal fiber having a core and a cladding; and
pump fiber cores having outer surfaces in direct contact with grooves in an outer surface of the cladding of the signal fiber,
wherein the signal fiber has an outer diameter of 400 $\mu m$, the pump fiber cores have outer diameters of 250 $\mu m$, and the grooves are 198 $\mu m$ wide and 75 $\mu m$ deep.

13. The fiber pump/signal combiner of claim 12, wherein the grooves are laser machined into the outer surface of the cladding of the signal fiber.

14. The fiber pump/signal combiner of claim 12, wherein the cladding of the signal fiber has a cross section formed by geometric subtraction of exactly six circles with diameters equal to those of the pump fiber cores from a larger circle.

15. The fiber pump/signal combiner of claim 12, wherein the pump fiber cores and the grooves twist around the outer surface of the cladding of the signal fiber.

16. The fiber pump/signal combiner of claim 12, wherein the fiber pump/signal combiner has a pump-light acceptance cross section that is larger than 188,400 $\mu m'$.

17. The fiber pump/signal combiner of claim 12, wherein adjacent pump fiber cores are in direct contact with each other.

18. A fiber laser system comprising the fiber pump/signal combiner of claim 12.

* * * * *